(12) United States Patent
Ford

(10) Patent No.: US 7,448,527 B1
(45) Date of Patent: Nov. 11, 2008

(54) SELF-WELDING FASTENER

(75) Inventor: Kenneth Ford, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 456 days.

(21) Appl. No.: 11/416,513

(22) Filed: Apr. 14, 2006

(51) Int. Cl.
*B23K 23/00* (2006.01)

(52) U.S. Cl. ............... 228/107; 228/108; 228/2.5

(58) Field of Classification Search .......... 228/107, 228/108, 2.5; 266/167
See application file for complete search history.

(56) References Cited

U.S. PATENT DOCUMENTS

| | | | | |
|---|---|---|---|---|
| 4,076,163 A | * | 2/1978 | Grande | 228/56.3 |
| 4,669,649 A | * | 6/1987 | Persson | 228/107 |
| 4,880,153 A | * | 11/1989 | Adolfsson | 228/2.5 |

* cited by examiner

*Primary Examiner*—Kiley Stoner
*Assistant Examiner*—Erin P Barry
(74) *Attorney, Agent, or Firm*—James T. Shepherd

(57) ABSTRACT

A fastener device has a body member for welding and securing structural members together. The body member has a lateral bore extending between an upper flat side and a lower flat side. The sides each have a pattern of externally facing grooves communicating with the lateral bore and an exothermic material fills the patterns of grooves, the lateral bore and a radially extending bore communicating with the lateral bore. A fuse in the radial bore produces intense heat in the exothermic material to initiate an exothermic reaction to melt at least some of the body member, exothermic material, and structural members and weld the body member and structural members together. The man-portable, self-contained, reliable, fastener device permits a relatively unskilled workman to securely interconnect the structural members together at a primitive work site without requiring ancillary equipment.

10 Claims, 5 Drawing Sheets

SELF-WELDING FASTENER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a device for interconnecting steel structural members together. More particularly, this invention permits a relatively unskilled worker to quickly weld steel structural members together at a dry or submerged work site.

Historically, secure connections between structural components have been made in many different ways. The structure may be drilled and tapped, welded with conventional welding equipment, or fabricated with adhesives (epoxies, cyanoacrylate, glues, etc.) to secure them together. These methods of interconnection can require elaborate and complicated procedures to assemble and bring together drilling and tapping tools and fasteners, welding gases and equipments, or adhesive components and mixing paraphernalia, respectively. The logistics and handling measures, and operational procedures required for the conventional methods of connection can be time consuming and expensive. Additionally, considerable skill may be required to apply these methods, particularly in underwater applications.

Thus, in accordance with this inventive concept, a need has been recognized in the state of the art for a cost effective, reliable and consistent, self-contained, portable device for quickly welding steel structural members together in air or underwater without requiring skilled labor.

SUMMARY OF THE INVENTION

The present invention provides an apparatus and method for interconnecting structural members together. A fastener device has a body member for welding and securing the structural members together. The metal body member is provided with a lateral bore extending between an upper flat side and a lower flat side. The sides each have a pattern of externally facing grooves communicating with the lateral bore and an exothermic material fills the patterns of grooves, the lateral bore and a radially extending bore communicating with the lateral bore. A fuse in the radial bore produces intense heat for the exothermic material to initiate an exothermic reaction of the exothermic material to melt at least some of the body member, exothermic material, and structural members and weld the body member and structural members together. The man-portable, self-contained, reliable, fastener device permits a relatively unskilled workman to securely interconnect the structural members together at a primitive work site without requiring ancillary equipment. The exothermic material can be thermite and the exothermic reaction can be a thermite reaction. A thin sealing layer covers the body member, fuse, and thermite in the grooves and lateral bore to provide protection from adverse effects of the natural environment, including water.

An object of the present invention is to provide a reliable device for and method of quickly securing iron/steel structural components together.

Another object of the invention is to provide a strong and reliable interconnection between iron/steel structural members that can be accomplished quickly by relatively unskilled workers.

Another object of the invention is to provide a quick and simplified interconnection for iron/steel structural members in air or underwater.

Another object of the invention is to provide a self-contained portable fastener device utilizing an exothermic or thermite reaction to provide quickly welded interconnection between steel structural members at a site in air or underwater.

Another object is to make a quickly welded interconnection in air or underwater without requiring additional support equipment.

Another object is to make a quickly welded interconnection between steel members at a work site in air or underwater using thermite reactions between compounds activated by an integral ignitor without requiring additional support equipment.

Another object is to provide a man-portable, self-contained, reliable, fastener device permitting an unskilled workman to make secure interconnections between structural members at a primitive work site.

These and other objects of the invention will become more readily apparent from the ensuing specification when taken in conjunction with the appended claims.

DESCRIPTION OF THE PREFERRED EMBODIMENT

Figure 1:
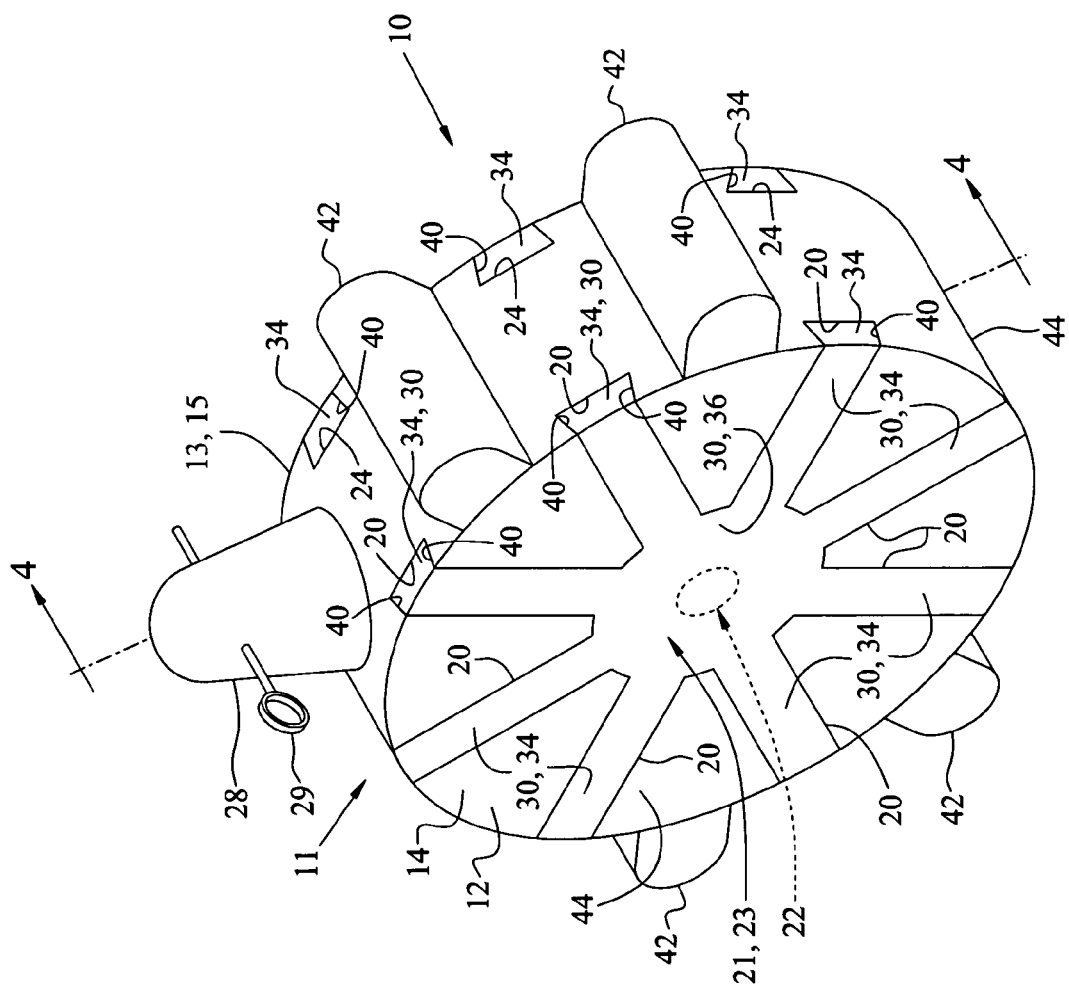
FIG. 1 is an isometric top view showing a pattern of thermite filled grooves on an upper face of the fastener device of the invention.
Figure 2:
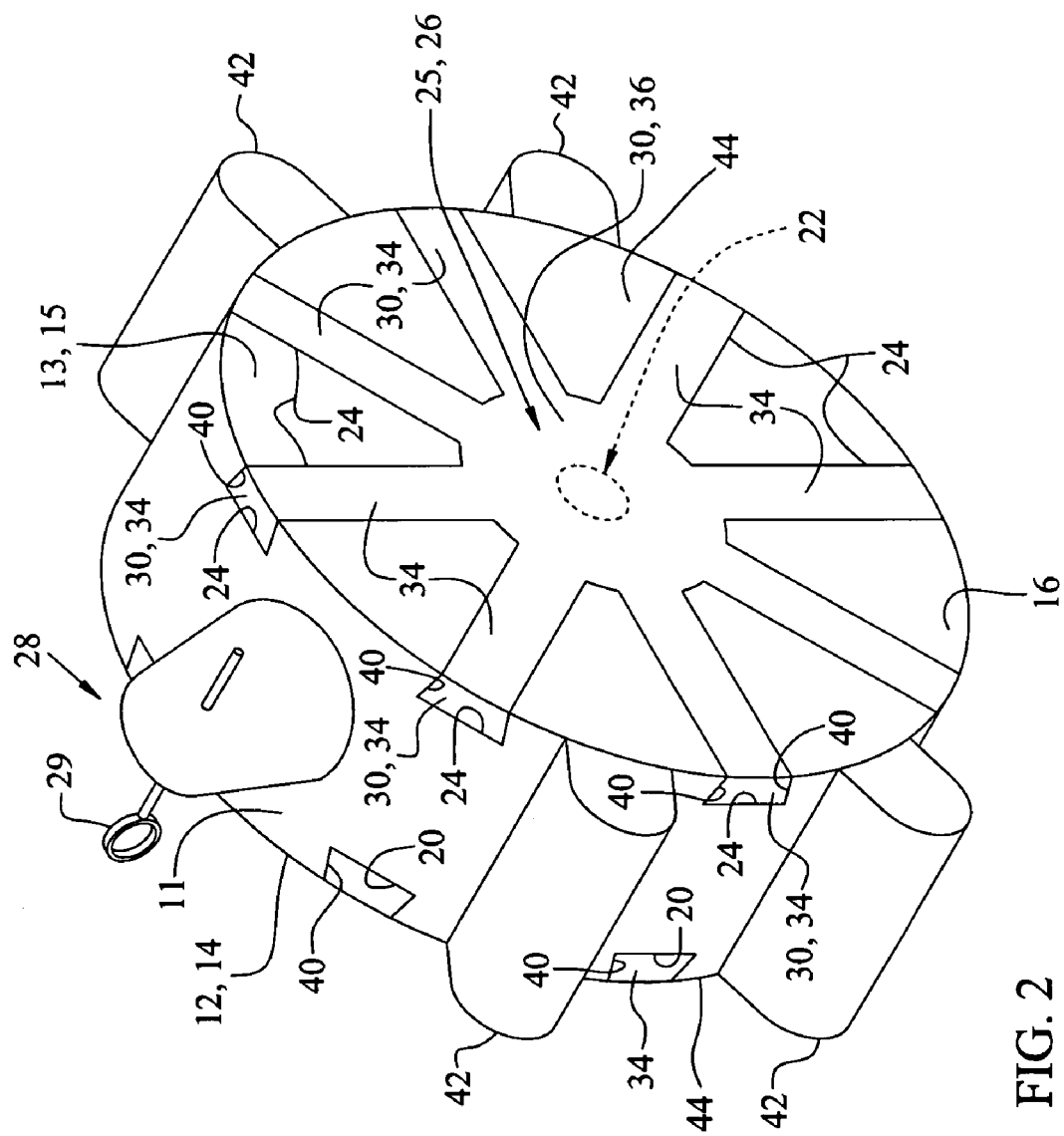
FIG. 2 is an isometric bottom view showing a pattern of thermite filled grooves on a lower face of the fastener device of the invention.

Referring to FIGS. 1 and 2 fastener device 10 of the invention has a substantially disc-shaped body member 11 having upper, or first, and lower, or second, flat sides 12 and 13 on opposite sides of body member 11 respectively provided with upper, or first, and lower, or second, flat faces 14 and 15. Body member 11 can be cast or machined from iron or steel to have considerable strength and toughness for interconnecting steel or iron structures. Body member 11 can be made in many different shapes other than the disc-shape depicted, and can be robustly dimensioned to interconnect and bear the loads and stresses transmitted by the structure it is to connect together; it being understood that fastener device 10 of the invention can be modifiable to accommodate a wide number of potential users and uses.

Figure 3:
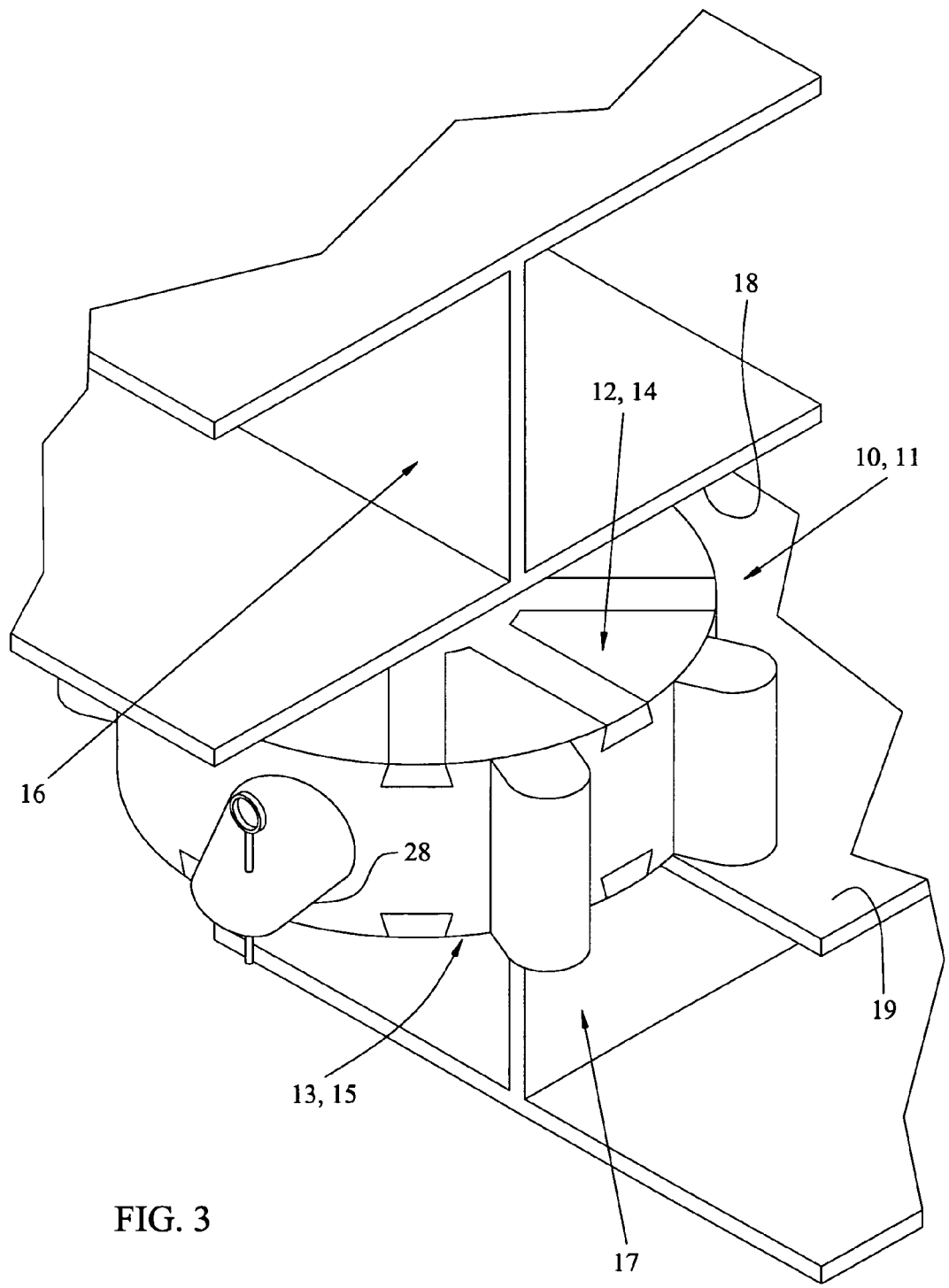
FIG. 3 shows a fastener device as it is being placed between a pair of steel I-beams that are to be welded together.

Referring also to FIG. 3, upper flat face 14 and lower flat face 15 of upper and lower sides 12 and 13 of fastener device 10 are sufficiently sized to present flat obstruction-free areas to assure reliable interconnection of a pair of iron or steel structural members 16 and 17. As shown in FIG. 3, fastener device 10 is being partially fit or slid between a pair of stacked I-beam structural members 16 and 17. The I-beam structural members 16 and 17 present flat surfaces 18 and 19 that can contiguously abut flat faces 14 and 15 of fastener device 10 of the invention. Structural members 16 and 17 could be any of a considerable number of widely used load bearing structural components other than the exemplary I-beams depicted, so long as they present sufficiently-sized flat surfaces that can contiguously abut flat faces 14 and 15.

Upper side 12 of body member 11 has several externally facing grooves 20 machined in it to radially extend from a first end 21 of a lateral bore 22 laterally extending through body member 11, and to contain heat-generating (or exothermic) material therein. Lateral bore 22 may have an enlarged part 23 at first end 21 where it communicates with external grooves 20 to contain additional heat generating (or exothermic) material as explained below. Lower side 13 of body member 11 also has several externally facing grooves 24 machined in it to radially extend from a second end 25 of lateral bore 22 and to contain heat generating (or exothermic) material therein. Lateral bore 22 may have another enlarged part 26 at second end 25 where it communicates with external grooves 24 to contain additional heat generating (or exothermic) material as explained below.

Figure 4:
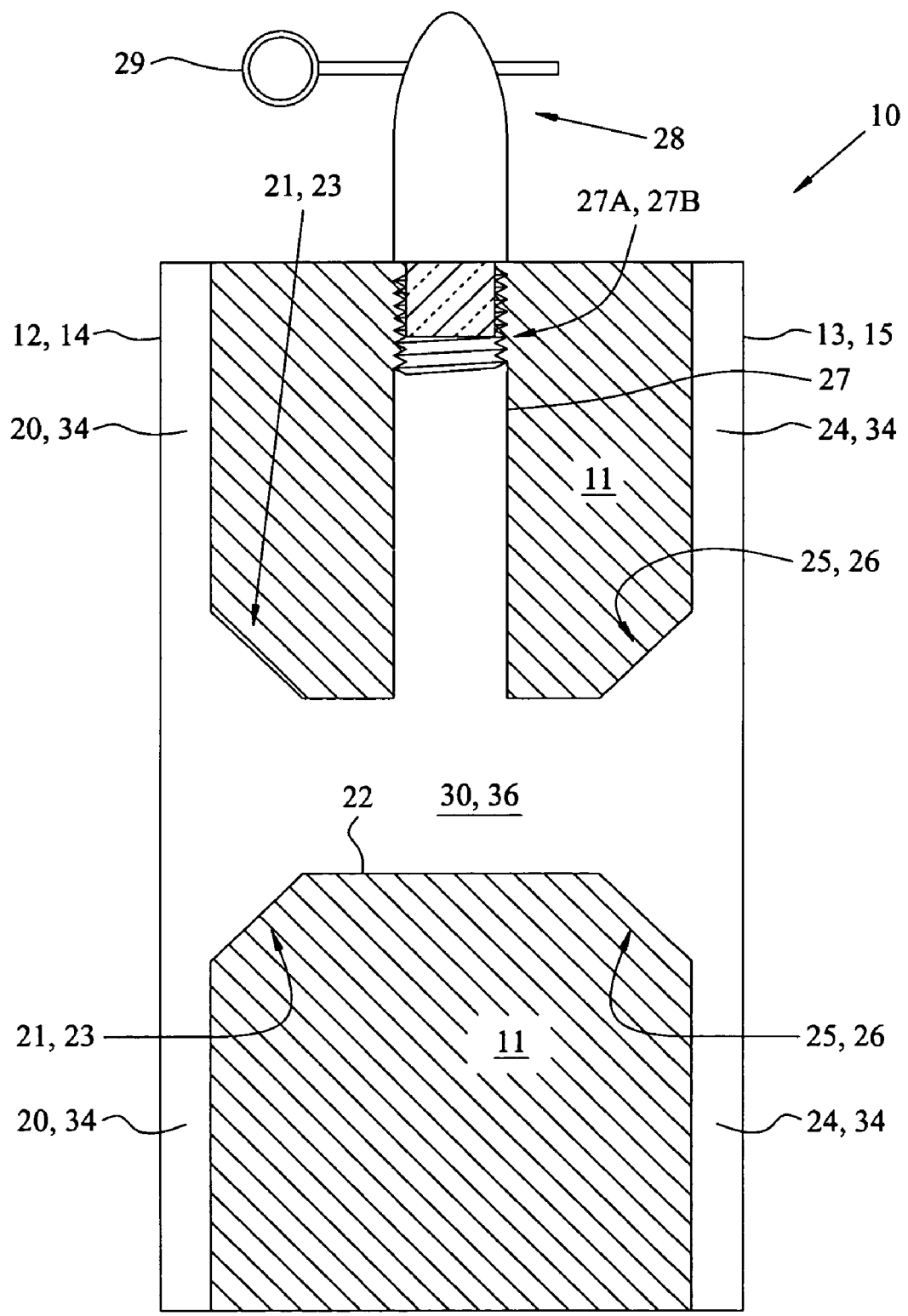
FIG. 4 is a cross-sectional view of details of the fastener device taken generally along line 4-4 in FIG. 1.

Referring also to FIG. 4, a radially extending bore 27 is provided in body member 11 to contain heat generating material as explained below. Radial bore 27 has an outer end 27A having threads 27B or other means for engaging and securing a fuse 28. Fuse 28 is sized and positioned to allow flat contiguous accommodation of flat faces 14 and 15 of fastener device 10 with flat surfaces 18 and 19 of structural members 16 and 17.

Fuse 28 may be any of several different widely used units that produce the intense level of heat needed to initiate the thermite reaction of thermite 30 that is in lateral bore 22, enlarged parts 23 and 26, radial grooves 20 and 24, and radially extending bore 27. In an uncomplicated form, fuse 28 can be a small exposure of magnesium ribbon or a mixture of potassium permanganate and glycerine or some other high-energy material such as thermite, which can be ignited by a torch or match to initiate the thermite reaction. Electrical bridge wires, ignitors, friction matches, match cord, igniters, and the off-the-shelf hand grenade fuse known in the inventory of the U.S. Army as the M201A1, are some examples of fuses that could be used. Fuse 28 depicted in FIG. 1 is such a known unit sealed and mounted in a sealed relationship in bore 27 for a wide variety of uses including underwater ignition. When a pull-ring 29 is forcibly pulled from fuse 28, a sufficient heat source is created for activation of thermite 30 to produce the thermite reaction.

External grooves 20 and 24 can be filled with groove portions 34 of thermite 30 and bore 22 (including enlarged parts 23 and 26 and radially extending bore 27) can be filled with a bore portion 36 of thermite 30 that has powdered reactants mixed with a binder to keep thermite 30 solid and prevent separation. Thermite 30 is capable of what is known as a thermite reaction (a type of aluminothermic reaction) that is one in which aluminum metal is oxidized by an oxide of another metal, most commonly iron oxide. The products of such a reaction are aluminum oxide, free elemental metal (usually Fe) and a great deal of heat that can be expressed in KJ/mole. Although these reactants of thermite 30 are stable at room temperature, when they are exposed to sufficient heat to ignite, (such as that created by the exemplary fuse 28 supra) they burn with an extremely intense exothermic reaction, the thermite reaction. The products of the exothermic reaction emerge as liquids (one of which being molten iron) due to the high temperatures reached (with iron (III) oxide, commonly 3000° C. (5432° F.) or more). Thermite 30 contains its own supply of oxygen, and does not require any external source (such as air). Consequently, thermite 30 cannot be smothered and may ignite in any environment, including under water, if given sufficient initial heat by fuse 28. Typical exemplary reactants for creating exemplary thermite reactions (aluminothermic reactions) can be:

$$3FeO + 2Al = 3Fe + Al_2O_3 + 783 \text{ KJ/mole} \quad (1.)$$

$$Fe_2O_3 + 8Al = 2Fe + Al_2O_3 + 759 \text{ KJ/mole} \quad (2.)$$

$$3Fe_3O_4 + 8Al = 9Fe + 4Al_2O_3 + 3010 \text{ KJ/mole} \quad (3.)$$

When thermite 30 is made to include iron(III) oxide as one of the reactants as shown in formula (2.) above, it can be made with about 25.3% aluminum and about 74.7% iron oxide by mass, for example. A small amount of binder can be included as part of the mass of the aluminum and iron oxide to hold the mixed reactants together in a desired form such as in the shape of groove portions 34 of thermite 30 in external grooves 20 and 24 and bore portion 36 of thermite 30 in bore 24 and enlarged parts 23 and 26. This mixture will create the welding process of fastener device 10 with structural members 16 and 17. Thermite 30, which has been premixed into a homogeneous quasi-stoichiometric mixture, would optimally include 10-15% excess aluminum, aluminum powder 3-500 micrometers in particle size, and iron oxide particles (with or without ferroalloy). Slag reducing additives may also be included. However, other percentages of constituent reactants can be tailored by one skilled in the art for different applications.

Thermite 30 can be press-fitted into external grooves 20 and 24 as groove portions 34 and in bore 24, enlarged parts 23 and 26 and radial bore 27 as bore portion 36. The cross-sectional shape of external grooves 20 and 24 can be shallow trapezoidal as shown and bore 22 can be cylindrical. Trapezoidal external grooves 20 and 24 have inwardly extending steel lip structure 40 provided in body member 11 to help retain groove portions 34 of thermite 30 in external grooves 20 and 24, see FIGS. 1 and 2. However, many other shapes for grooves 20 and 24 and bores 24 and 27 can be made (such as V, round, square, etc.) by different machining operations to retain different amounts of thermite 30 in groove portions 34 and bore portion 36 and to retain fuse 28.

External grooves 20 and 24 are depicted as extending in a radially extending pattern from bore 24. Other arrangements or patterns of external grooves 20 and 24 can be provided for in sides 12 and 13 of body member 11, such as one or more spiral or matrix patterns that communicate with bore 22, for example.

The amount of thermite 30 of groove portions 34 and bore portion 36 is selected to create sufficient heat during the thermite reaction to produce sufficient quantities of molten iron and/or steel from at least the parts of reagents of thermite 30, of upper and lower sides 12 and 13 of body member 11 adjacent to and around bore 22 and along grooves 20 and 24, and parts of surfaces 18 and 19 of structural members 16 and 17 that are adjacent to grooves 20 and 24 and bore 22. The molten iron and/or steel of body portion 11 and structural members 16 and 17 flow together, and weld fastener device 10 and structural members 16 and 17 together as the molten material cools.

However, in any pattern of external grooves 20 and 24 and bore 22, care must be taken that only sufficient amounts of thermite 30 are contained as groove portions 34 in grooves 20 and 24 and bore portion 36 in bore 22 to generate sufficient heat during the thermite reaction of thermite. 30 to melt and weld at least parts of reagents of thermite 30, upper and lower sides 12 and 13 of body member 11, and surfaces 18 and 19 of structural members 16 and 17 together but not so much thermite 30 that might cut them or blow them apart. In other words, it is important to dimension external grooves 20 and 24 and bore 22 so that they contain only enough thermite 30 to melt and weld at least portions of the reagents of thermite 30, parts of body member 11, and parts of surfaces 18 and 19 of structural members 16 and 17, and not contain so much thermite 30 that would create an over-energetic thermite reaction and forcibly push or blow adjacent surfaces 14 and 18, and 15 and 19 and melted reagents apart into separated constituents that aren't welded together. It can easily be determined by one of skill in the art, with little or no experimentation, how to properly size external grooves 20 and 24 and bore 22 in body member 11 to contain the appropriate amount of thermite 30 in groove portions 34 and bore portions 36.

Figure 5:
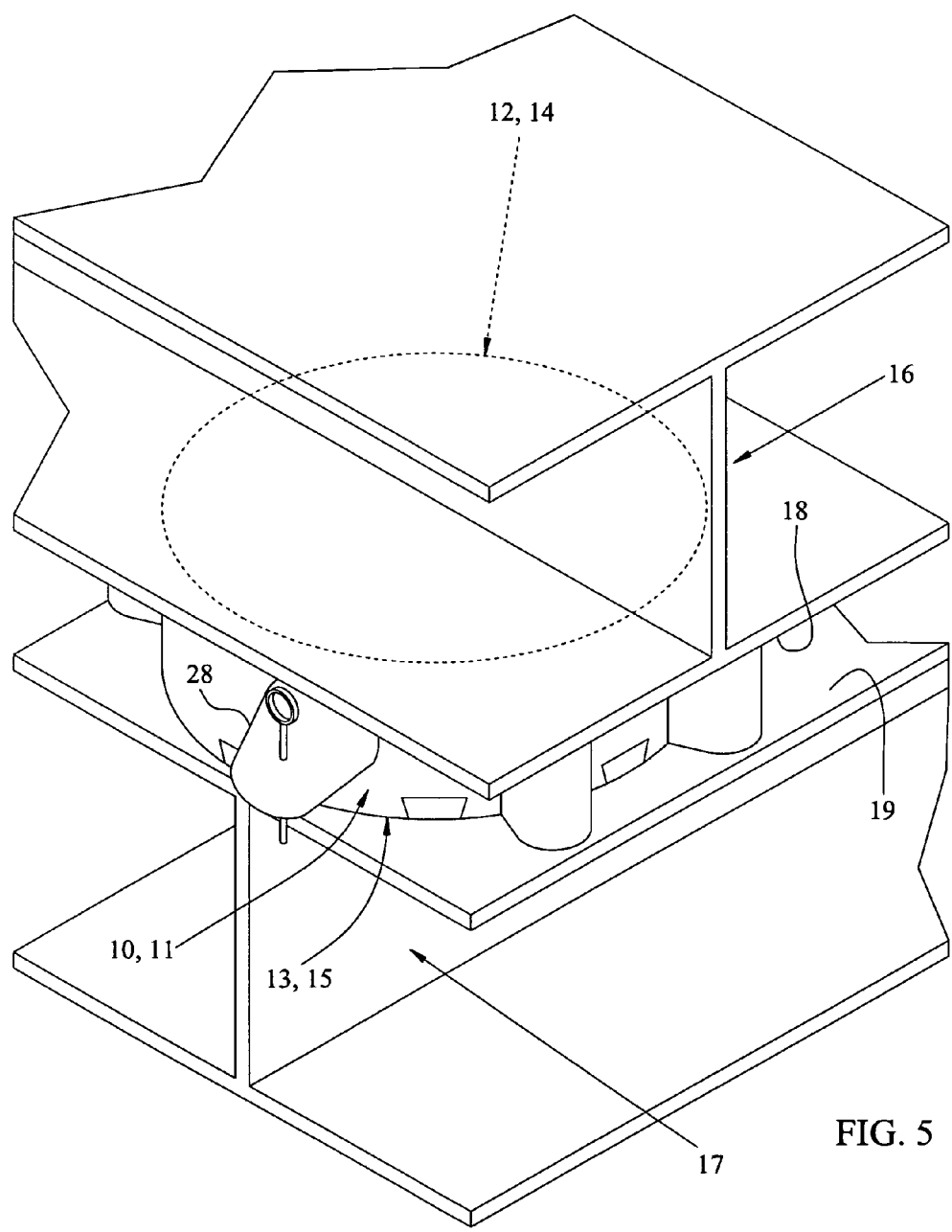
FIG. 5 shows fastener device of the invention between a pair of I-beams and patterns of thermite-filled grooves on opposite faces abut separate ones of the I-beams for welding them together in a secure interconnection.

Referring to FIG. 5, fastener device 10 is shown held between and adjacent to structural members 16 and 17 during the welding-interconnection of fastener device 10. Because of the intense heat generated during the thermite reaction of ignited thermite 30, the oozing and dripping molten metal and slag can create a significant hazard. In underwater use, steam pockets can be created that transmit intolerable levels of heat and violent noise through the water medium. A workman usually cannot safely hand-hold fastener device 10 on flat face surfaces 18 and 19 of members 16 and 17 during ignition of thermite 30. Accordingly, a number of holding mechanisms 42 can be attached along the outer edge of body member 12 to securely hold upper and lower flat face surfaces 14 and 15 of body member 11 against flat surfaces 18 and 19 of structural members 16 and 17 during the thermite welding reaction. Typically, holding mechanisms 42 can be magnets, adhesives, rigging, or conventional fasteners. In addition, heat resistant lines or elastic strips can be secured to fastener device 10 and to structural members 16 and 17 to securely hold groove portions 34 and bore portion 36 of thermite 30 in body member 11 contiguously against surfaces 18 and 19 of structural members 16 and 17. External braces extending between device 10 and other stationary fixtures might also be used or a workman might use a long handled tool to hold fastener device 10 in place during welding. Any number of well-known holding or fixturing expedients will suggest themselves to one of skill in the art to safely hold fastener device 10 between and against surfaces 18 and 19 of structural members 16 and 17 during the welding process described herein. The force of gravity acting on the dead weight of an upper structural member 16 can securely sandwich a relatively robust fastener device 10 between structural members 16 and 17 and hold face surfaces 14 and 15 of device 10 in a contiguous abutment with surfaces 18 and 19 of structural members 16 and 17.

A thin sealing material layer 44 can be coated or otherwise applied over the exposed area of body member 11 and thermite 30 in grooves 20 and 24 and bore 22. Sealing layer 44 protects fastener device 10 including its reactants from the adverse effects of the natural environment and can make it waterproof for reliable application in the undersea environment. When thermite 30 is ignited, sealing layer 44 burns away and does not interfere with welding of device 10 and structural members 16 and 17.

In operation and referring to FIGS. 3 and 5, since an effective fastener device 10 can be made in a compact size to make it man-portable, a workman/diver can carry fastener device 10 to an in-air or underwater work site. Lower flat side 13 of body member 11 is placed to lie against and abut contiguously adjacent to flat surface 19 of a steel (or metal) structural member 17. The other structural member 16 to be welded to structural member 17 is placed on top of fastener device 10 so that part of its flat surface 18 lies against and abuts contiguously adjacent to upper flat side 12 of body member 11. Holding mechanisms 42 including, but not limited to, the force of gravity hold the sandwiched fastener device 10 and structural members 16 and 17 together. Fuse 28 is actuated by pulling ring 29 or other means of activation. Ignition of fuse 28 initiates the thermite reaction of thermite 30 of bore portion 36 and groove portions 34 and the molten metal (iron/steel) of thermite 30 and body member 11 of fastener device 10 adjacent to bore 22 and grooves 20 and 24 and structural members 16 and 17 flow together and begin to cool and solidify. After the molten metal has cooled sufficiently not only are fastener device 10 and structural members 16 and 17 welded together, but structural members 16 and 17 are welded together via fastener device 10 of the invention.

Having the teachings of this invention in mind, modifications and alternate embodiments of fastener device 10 may be adapted. The shape of body member 11 can be altered to have differently oriented flat face surfaces to fit and accommodate other differently-shaped and oriented structural members 16 and 17 and weld them together on the spot. Fuse 28 and its bore 27 could be located to extend in any number of positions in body member 12 to hold thermite 32 and fuse 28.

Furthermore, fastener device 10 of the invention can be modified to weld other materials together using reagents other than the aforedescribed steel/iron constituents/reagents. For example body member 12 of fastener device 10 could be made from other metals or plastic compounds and have grooves 20 and 24 and bore 22 filled with other mixed reagents such as other metal reagents or plastic compound reagents. These other metal reagents and plastic compound reagents can be appropriately initiated by a fuse as described above or by addition of a catalyst or other suitable stimulus for different chemical exothermic reactions. In either case the other metal reagents or plastic compounds are stimulated to undergo exothermic reactions that will melt and weld the other metals or plastic compounds together. Different reagents and the procedures for initiation of their exothermic reactions to enable connection to different structures are known. Selection from these known expedients for inclusion in fastener device 10 of the invention can be readily done within the scope of one having ordinary skill in the art. In addition to the compact and portable unit described, fastener device 10 could have different shapes and different sizes to assure positive interconnection with other structures under different operational scenarios.

The disclosed components and their arrangements as disclosed herein, all contribute to the novel features of this invention. Fastener device 10 is a rugged, portable means for assuring real-time connection of structural members in air and underwater. Fastener device 10 provides a man-portable, self-contained, reliable, and secure interconnection of structural members by an unskilled workman at a primitive work site. The description of fastener device 10, as disclosed herein, is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An apparatus for interconnecting structural members comprising:

a body member having a lateral bore, an upper flat side provided with an upper flat face, a lower flat side provided with a lower flat face on the opposite side of said body member as said upper flat side, and a bore radially extending from said lateral bore, said body member being shaped to fit between adjacent structural members and locate said upper flat face and lower flat face to abut contiguously adjacent to a separate one of said structural members, said upper flat side and said lower flat side each having a pattern of externally facing grooves communicating with said bore;

an exothermic material contained in said pattern of grooves, said lateral bore and said radially extending bore;

a fuse in said bore configured to produce intense heat at said exothermic material to initiate an exothermic reaction of said exothermic material, said exothermic reaction generating sufficient heat to melt at least some of said body member, exothermic material, and structural members and thereby weld said body member and structural members together.

2. The apparatus of claim 1 wherein said body member is made of metal.

3. The apparatus of claim 1 wherein said metal body member includes an oxide of iron.

4. The apparatus of claim 1 further comprising:

at least one holding mechanism associated with said body member to hold at least one of said upper flat face and said lower flat face adjacent to said structure during said exothermic reaction.

5. The apparatus of claim 4 wherein said body member is disc-shaped and said holding mechanism can be the force of gravity.

6. The apparatus of claim 1 wherein said exothermic material is thermite and said exothermic reaction is a thermite reaction.

7. The apparatus of claim 1 further comprising:

inwardly extending lip structures in said upper and lower flat sides adjacent to said grooves to retain groove portions of said exothermic material in said grooves.

8. The apparatus of claim 1 further comprising:

a sealing layer covering said body member, said fuse, and said exothermic material in said grooves and said bore to provide protection from adverse effects of the natural environment including water.

9. The apparatus of claim 1 wherein said grooves are arranged in a radially extending pattern across said upper flat side and said lower flat side from said bore.

10. The apparatus of claim 6 wherein said thermite contains reagents of aluminum metal and iron oxide.

* * * * *